United States Patent [19]
Tsunefuji et al.

[11] Patent Number: 5,576,784
[45] Date of Patent: Nov. 19, 1996

[54] FILM TRANSPORT DEVICE OF CAMERA

[75] Inventors: Katsuhiko Tsunefuji, Sagamihara; Takashi Watanabe, Akishima, both of Japan

[73] Assignee: Olympus Optical Co., Ltd., Tokyo, Japan

[21] Appl. No.: 356,694

[22] Filed: Dec. 15, 1994

[30] Foreign Application Priority Data

Dec. 17, 1993 [JP] Japan ................................. 5-318459

[51] Int. Cl.$^6$ ................................................. G03B 1/18
[52] U.S. Cl. ................................................. 396/418
[58] Field of Search ........................... 354/173.1, 173.11

[56] References Cited

U.S. PATENT DOCUMENTS

| | | | |
|---|---|---|---|
| 5,075,707 | 12/1991 | Shibayama et al. | 354/173.1 |
| 5,221,940 | 6/1993 | Daitoku et al. | 354/173.1 |
| 5,437,416 | 8/1995 | Ezawa et al. | 354/173.1 |

FOREIGN PATENT DOCUMENTS

| | | |
|---|---|---|
| 57-96321 | 6/1982 | Japan . |
| 2-67534 | 3/1990 | Japan . |
| 2-67535 | 3/1990 | Japan . |

Primary Examiner—David M. Gray
Attorney, Agent, or Firm—Louis Weinstein

[57] ABSTRACT

In order to smoothly feed out, wind and rewind a film housed in a film patrone with a simple construction by rotating a spool shaft in the film patrone in correlation to the forward and backward rotation of a motor, a film transport device of a camera comprises a motor for producing an output for feeding and winding the film, a motor shaft for transmitting the output from the motor, a planetary gear mechanism serves as a differential gear mechanism for transmitting the output of the motor shaft to the spool shaft in the film patrone, and a planetary clutch mechanism as a transmission mechanism. When the spool shaft in the film patrone is driven by the film wound on the wind spool, a differential operation performed by the differential gear mechanism prevents the speed-up rotation of the motor shaft.

29 Claims, 4 Drawing Sheets

FILM TRANSPORT DEVICE OF CAMERA

BACKGROUND OF THE INVENTION

1. Field of the Invention

The present invention relates to a film transport device of a camera, and more particularly, to a film transport device of a camera in which a film patrone housing a leading end of a film therein is loaded.

2. Description of the Related Art

There has recently been invented a film patrone in which an initial feed-out operation of the leading end of a film housed therein is performed when it is loaded in a camera. In a camera used with such a film patrone loaded therein, various suggestions have been made about a film transport device which feeds out, winds and rewinds a film, wound on a spool shaft in the film patrone, out of the film patrone by forwardly and backwardly rotating the spool shaft by the driving force of a drive motor.

For example, a film transport device of a camera disclosed in Japanese Laid-Open Patent Application No. 96321 of 1982 winds and rewinds a film with two one-way clutches respectively disposed in a driving portion on the side of a spool shaft in a film patrone and a driving portion on the side of a film wind spool in order to stably transport the film by rotating the spool shaft in the film feed-out direction.

In a film transport mechanism of a camera disclosed in Japanese Laid-Open Patent Application No. 67534 of 1990, an engaging shaft having a fork portion to be engaged with a film supply spool in a film patrone and a film wind spool are simultaneously driven, the peripheral speed difference between a film feed-out operation and a film wind operation, which is caused by the start of the film wind operation by the film wind spool after the film feed-out operation, is absorbed by a one-way clutch disposed on the side of the fork portion, and, when the film is rewound, the rotational driving force is not transmitted through this one-way clutch, but through a train of gears to the fork portion engaged with the film supply spool in the film patrone.

Although the above-mentioned peripheral speed difference is determined by the diameter of the film wind spool, the diameter of the spool in the film patrone, the reduction ratio of a film wind driving system, the reduction ratio of a film feed-out driving system and the like, the film wind speed is set to be higher than the film feed-out speed in order to increase the number of exposures per second and to perform an initial film feed-out operation with reliability.

A film transport device of a camera disclosed in Japanese Laid-Open Patent Application No. 67535 of 1990 is provided with a switching means, comprising two one-way clutches and a train of planetary gears, to switch the transmission of the driving force to a patrone shaft by changing the rotating direction of a drive motor, thereby feeding out, winding and rewinding the film.

In this case, the reduction ratio on the rewind side is higher than that on the wind side, by which one of the one-way clutches does not transmit the rotation for rewinding to a film wind spool. Since the reduction ratio of the gears for feeding the film out is higher than that on the wind side, when the film is fed out and wound on the wind spool, the other one-way clutch for transmitting the driving force on the feed-out side is freed as the rotating speed of the wind spool is high.

However, since the film transport device disclosed in the above Japanese Laid-Open Patent Application No. 96321 of 1982 uses one-way clutches, it is difficult to transmit the driving force when the clutches are acting, and when the film wound on the spool shaft in the film patrone is fed out and wound, the wind diameter of the film is decreased in the film patrone. When the film feed-out resistance is increased, the film wind operation is not performed smoothly.

Furthermore, in the film transport device disclosed in the above Japanese Laid-Open Patent Application No. 67534 of 1990, since the train of gears for transmitting the rotating force of a drive motor to the fork portion needs two transmission systems respectively for feeding out and rewinding the film, the film transport mechanism is complicated and the number of components is large. Therefore, the space occupied by the film transport mechanism itself is enlarged.

Still furthermore, in the film transport device disclosed in the above Japanese Laid-Open Patent Application No. 67535 of 1990, since the difference in reduction ratio between the film rewind mechanism and the film feed-out mechanism is a limitation in design, the reduction ratios thereof cannot be set at the same value in order to reduce the number of gears and downsize the mechanisms.

Since the devices disclosed in the above Japanese Laid-Open Patent Applications Nos. 67534 of 1990 and 67535 of 1990 use one-way clutches in the same manner as the device disclosed in the above Japanese Laid-Open Patent Application No. 96321 of 1982, they have the same problem that the film wind operation is not performed smoothly.

SUMMARY OF THE INVENTION

A main object of the present invention is to provide a film transport device of a camera which can smoothly feed out, wind and rewind a film by absorbing a peripheral speed difference caused in a film wind operation and a film rewind operation.

Another object of the present invention is to provide a film transport device of a camera which can smoothly feed out, wind and rewind a film through an ingenious use of a planetary gear mechanism, a planetary clutch mechanism and the like and contribute to the downsizing of the camera by simplifying a construction thereof.

According to a first aspect of the present invention, there is provided a film transport device of a camera in which the film wind speed for winding a film on a wind spool is set higher than the film feed-out speed for winding the film by rotating a spool shaft in a film patrone, the film transport device comprising a motor for producing an output for feeding out or winding the film, a motor shaft for transmitting the output from the motor, and a differential gear mechanism for absorbing the driving force from the spool shaft in the film patrone by a differential operation when a peripheral speed difference is caused between the wind spool and the spool shaft, and for preventing the speed-up rotation of the motor shaft.

According to a second aspect of the present invention, a film transport device of a camera in which the film wind speed for winding a film on a wind spool is set higher than the film feed-out speed, the film transport device comprising one motor for feeding out and winding the film, a first transmission mechanism for transmitting the driving force to the wind spool for winding the film thereon, a second transmission mechanism for transmitting the driving force to a spool shaft in a film patrone, and a differential gear mechanism for distributing the output of the motor to the first and second transmission mechanisms, and for preventing the speed-up rotation of a motor shaft when the spool shaft in the film patrone is driven by the film wound on the wind spool and a peripheral speed difference is caused between the wind spool and the spool shaft.

According to a third aspect of the present invention, a film transport device of a camera in which the film wind speed for winding a film on a wind spool is set higher than the film feed-out speed, the film transport device comprising a first transmission mechanism for transmitting an output from a motor to the wind spool, a planetary gear mechanism for providing an output to a second transmission mechanism, for transmitting the output from the motor to a spool shaft in a film patrone, through an internal gear, and a revolution preventing means for preventing the one-way revolution of a planetary gear disposed in the planetary gear mechanism and for transmitting the driving force from the planetary gear to the internal gear, whereby the speed-up rotation of a motor shaft is prevented by the revolution of the planetary gear around the internal gear in a direction opposite to the preventing direction of the revolution preventing means when the spool shaft in the film patrone is driven by the film wound on the wind spool.

These and other objects and advantages of the present invention will be more apparent from the following detailed description.

According to the present invention, it is possible to provide a film transport device of a camera which can smoothly feed out, wind and rewind a film by ingeniously using a planetary gear mechanism and a planetary clutch mechanism.

DETAILED DESCRIPTION OF THE PREFERRED EMBODIMENT

A preferred embodiment of the present invention will now be described with reference to the attached drawings.

Figure 1:
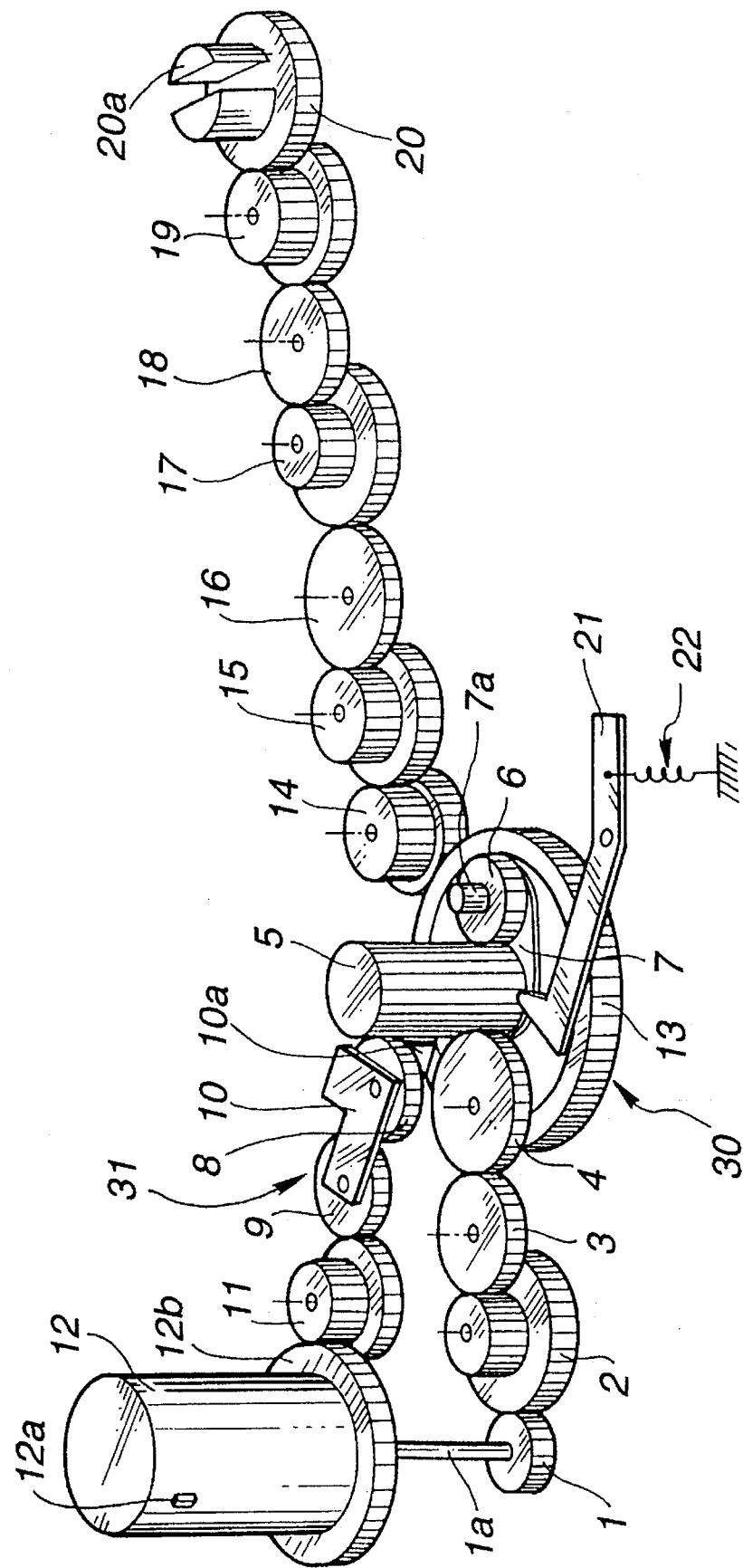
FIG. 1 is a perspective view of a film transport device of a camera according to an embodiment of the present invention.
Figure 2:
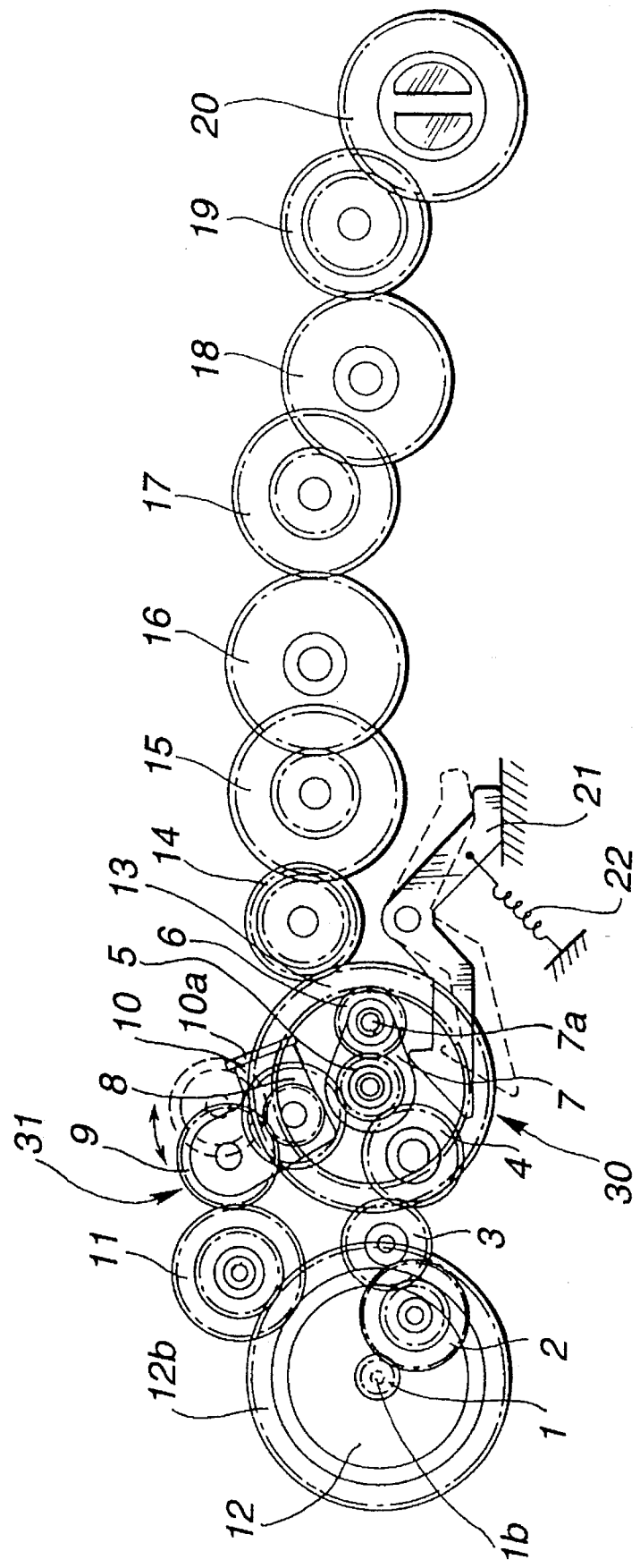
FIG. 2 is a plan view of the film transport device shown in FIG. 1 as viewed from the top side thereof.

Referring to FIG. 1, a wind spool 12 is formed by a cylindrical case and is provided with a spool claw 12a in the upper portion on the outer peripheral surface thereof. The spool claw 12a is, as described below, engaged with one of the perforations at the leading end of a film fed out of a film patrone to wind the film on the outer peripheral surface of the wind spool 12. A motor is built in the cylindrical case of the wind spool 12. A motor shaft 1a as an output shaft of the motor projects downward from the wind spool 12, and is fixed to a motor gear 1 at the leading end thereof. The motor gear 1 is engaged with a lower major diameter gear of a double gear 2, and connected to a first sun gear 5 in a planetary gear mechanism 30 as a differential gear mechanism through an upper minor diameter gear of the double gear 2 and spur gears 3 and 4.

The planetary gear mechanism 30 functions as a distribution means for respectively distributing and transmitting the output of the motor to a train of gears as a first transmission gear means, including a planetary clutch mechanism 31 as a first transmission mechanism, for transmitting the output of the motor to the wind spool 12, and to a train of gears as a second transmission mechanism and a second transmission gear means for transmitting the output to a fork portion 20a engaged with a spool shaft (not shown) disposed in the film patrone to feed out, wind and rewind the film.

The planetary gear mechanism 30 comprises the cylindrical first sun gear 5 supported rotatably on its center axis at one end of a first carrier 7, a first planetary gear 6 supported rotatably on a carrier shaft 7a embedded at the other end of the first carrier 7, and an internal gear 13 engaged with the first planetary gear 6 on the inner peripheral surface thereof and provided with an indented portion on the outer periphery surface.

The first sun gear 5 transmits the driving force to the above-mentioned planetary clutch mechanism 31 as a transmission mechanism comprised of a second sun gear 8, a second planetary gear 9 and a second carrier 10. The planetary clutch mechanism 31 is placed under the wind spool 12 through a double gear 11, and has a clutch function for transmitting and cutting off the driving force to a spool gear 12b which rotates integrally with the wind spool 12.

A standing portion 10a of the second carrier 10 formed at one end where the second sun gear 8 is disposed functions as a stopper to be engaged with a leading portion of the carrier shaft 7a supporting the first planetary gear 6 when the first planetary gear 6 revolves counterclockwise, so that the counterclockwise revolution of the planetary gear 6 over a predetermined distance is prevented.

Furthermore, a lever 21 is placed near the outer peripheral side of the planetary gear mechanism 30. The lever 21 is supported pivotally on the near center point thereof by the main body of the camera (not shown), and one end thereof is put in contact with a part of the camera main body by an urging force of a compression spring 22 fixed to the camera main body. The other end of the lever 21 is shaped like a hook and functions as a one-way stopper, that is, a revolution preventing means to prevent the planetary gear 6 from revolving clockwise over a predetermined distance by engaging with the leading portion of the carrier 7a, which supports the first planetary gear 6, when the first planetary gear 6 revolves clockwise.

The revolution of the first planetary gear 6 in the planetary gear mechanism 30 over a predetermined distance is thus prevented by the standing portion 10a of the carrier 10 in the planetary clutch mechanism 31 and the lever 21 functioning as a revolution preventing means and a one-way stopper, and simultaneously, the rotating direction of the internal gear 13 can switched.

The driving force transmitted through the indented portion formed on the outer peripheral surface of the internal gear 13 is transmitted to a fork gear 20 through a train of gears 14, 15, 16, 17, 18 and 19 to rotationally drive the fork portion 20a which rotates integrally with the fork gear 20. Therefore, when the fork portion 20a is rotated, a spool shaft (not shown) in the film patrone engaged with the fork portion 20a also rotates, thereby feeding out, winding and rewinding the film in the film patrone.

The operation of the film transport device of the camera having the above construction according to the embodiment of the present invention will be described below with reference to FIGS. 3 to 6.

Figure 3:
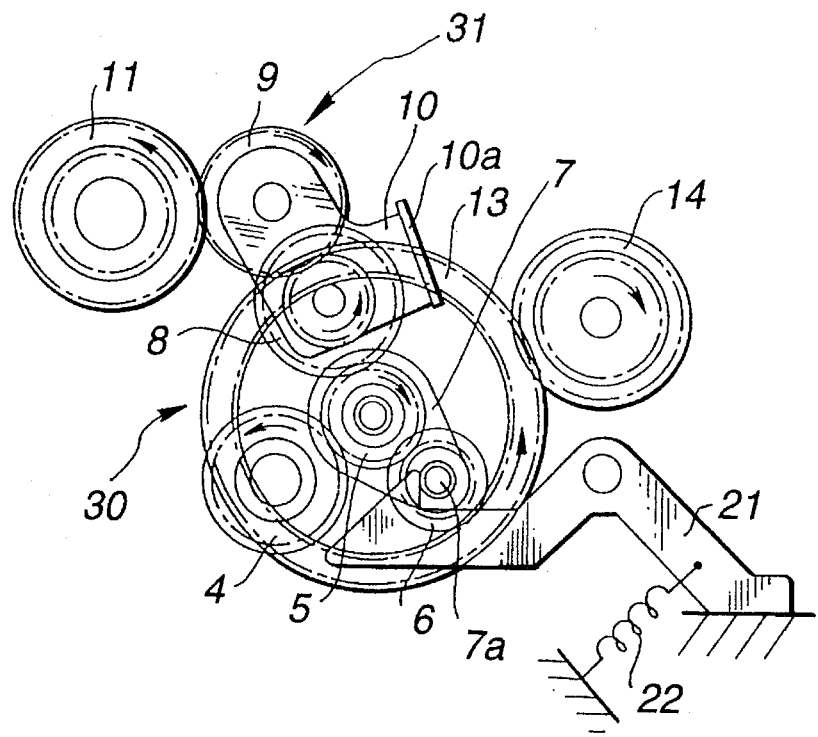
FIG. 3 is an enlarged view of the principal part of a planetary gear mechanism in the film transport device shown in FIG. 1 to show an operation for feeding a film out of a film patrone.

When the motor built in the wind spool 12 is rotated clockwise, the driving force of the motor rotates the first sun gear 5 clockwise through the motor shaft 1a and the gears 1, 2, 3 and 4 as shown in FIG. 3. Then, the second sun gear 8 in the planetary clutch mechanism 31 rotates counterclockwise together with the second carrier 10, the second planetary gear 9 engages with the major diameter gear of the double gear 11, and the minor diameter gear of the double gear 11 engages with the spool gear 12b, by which the wind spool 12 rotates in the film wind direction, that is, the clockwise direction.

On the other hand, the first planetary gear 6 and the first carrier 7 in the planetary gear mechanism 30 revolve clockwise in correlation to the clockwise rotation of the first sun gear 5 until they are caught by the lever 21. When the carrier shaft 7a engages with the hook portion formed at the leading end of the lever 21, the revolution of the first planetary gear 6 is stopped. Then, the counterclockwise rotating force of the first planetary gear 6 rotates, in the counterclockwise direction, the internal gear 13 engaged with the first planetary gear 6 on the inner peripheral surface thereof, and simultaneously, the indented portion on the outer peripheral surface of the internal gear 13 rotates the fork portion 20a through the gears 14, 15, 16, 17, 18, 19 and 20 in the film feed-out direction, that is, the clockwise direction.

Therefore, the rotational driving force of the motor idles the wind spool 12 while rotating the fork portion 20a to rotate the spool shaft in the film patrone in engagement with the fork portion 20a in the film feed-out direction, thereby feeding the film out of the film patrone toward the wind spool 12.

As described above, the film fed out of the film patrone reaches the wind spool 12, the perforation thereof is fitted on the spool claw 12a formed on the outer peripheral surface of the wind spool 12, and the film is wound on the wind spool 12.

Figure 4:
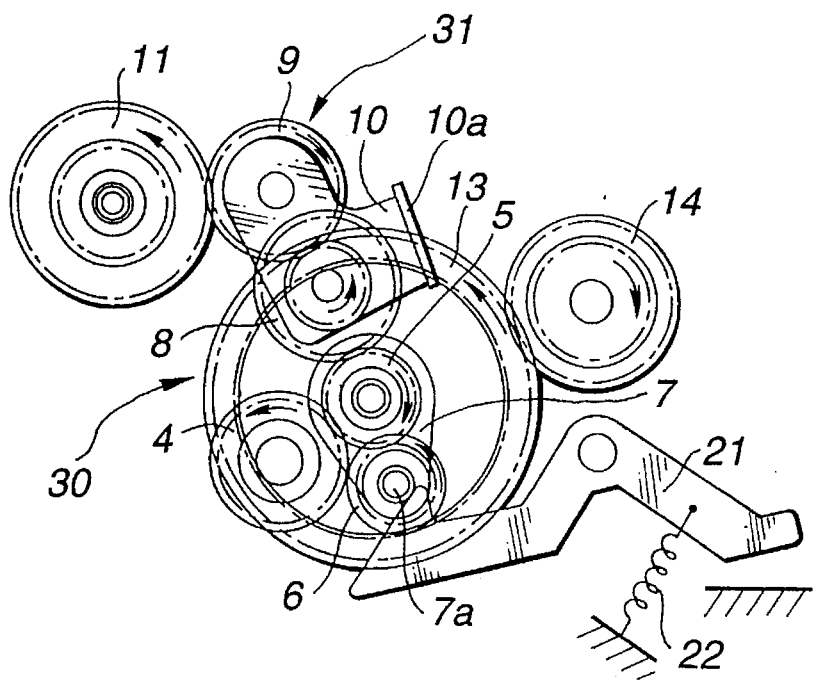
FIG. 4 is an enlarged view of the principal part of the planetary gear mechanism in the film transport device shown in FIG. 1 to show an operation for winding the film in the film patrone onto a wind spool.
Figure 5:
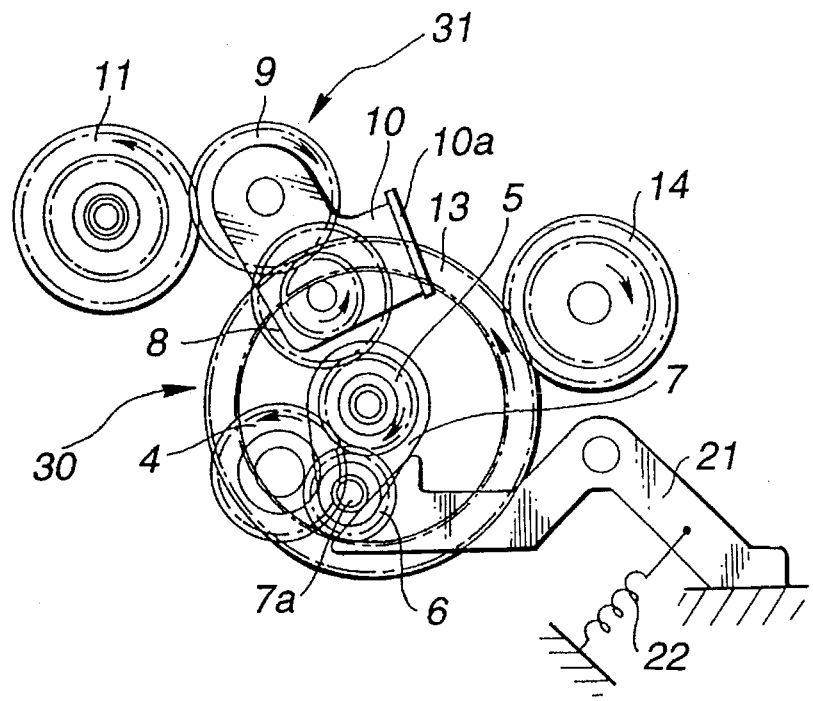
FIG. 5 is an enlarged view of the principal part of the planetary gear mechanism in the film transport device shown in FIG. 1 to show an operation for winding the film in the film patrone onto the wind spool.

As shown in FIGS. 4 and 5, since the motor built in direction in the film wind operation in the similar manner as the above-mentioned film feed-out operation, each gear rotates in the same direction and operates in the same manner as in FIG. 3.

In the film wind operation, the film feed-out operation is also being performed simultaneously. Therefore, unless the peripheral speed of the wind spool 12 is always higher than that of the spool shaft in the film patrone concerned with the film feed-out operation, the film fed from the spool shaft in the film patrone is not securely wound on the wind spool 12 and is slackened inside the camera. Therefore, the reduction ratio of the train of gears on the film feed-out side (or the film rewind side) is higher than that on the film wind side. When the film is wound, the peripheral speed difference is caused, the spool shaft in the film patrone is driven by the film wound by the wind spool 12, and the number of rotations of the train of gears (gears 14 to 20) connected to the fork portion 20a engaged with the spool shaft in the film patrone is larger than that in the feed-out driving (winding) by the motor.

Since the peripheral speed of the internal gear 13 in the counterclockwise direction (in the direction of the arrow in FIGS. 4 and 5) also increases, the first planetary gear 6 stopped by the lever 21 increases its revolving force in the counterclockwise direction. At this time, the revolution of the first planetary gear 6 turns the lever 21 against the urging force of the compression spring 22. In other words, since the revolution of the planetary gear 6 acts in the opposite direction to the direction in which the lever 21 itself is retained by the camera main body, the lever 21 is pushed by the carrier shaft 7a supporting the first planetary gear 6 and rotated counterclockwise against the urging force of the compression spring 22. Then, the carrier shaft 7a passes over the hook portion at the leading end of the lever 21 (FIG. 4). Since such revolving operation of the planetary gear 6 has no effect on the train of gears on the film wind side, the film is smoothly wound (FIG. 5).

Figure 6:
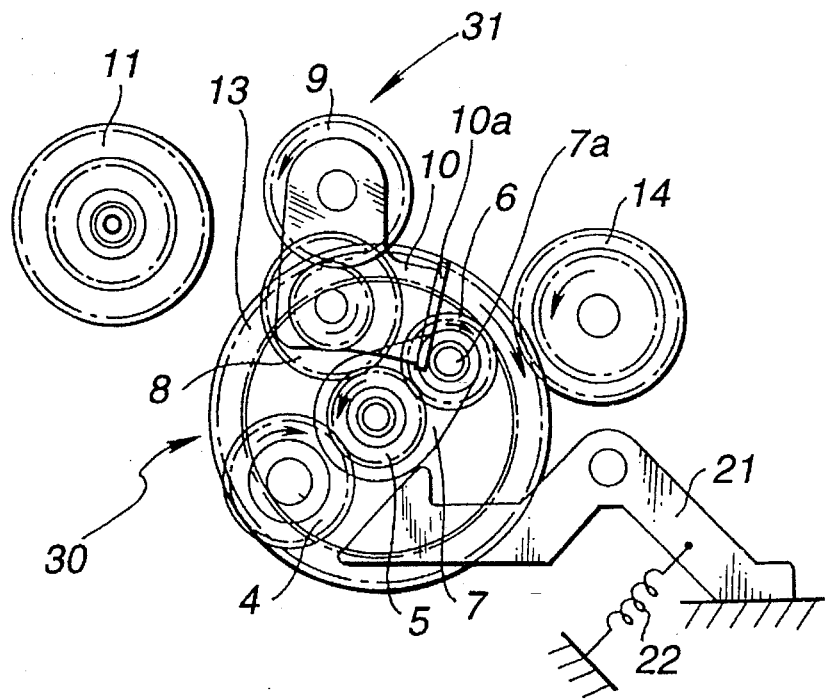
FIG. 6 is an enlarged view of the principal part of the planetary gear mechanism in the film transport device shown in FIG. 1 to show an operation for rewinding the film wound on the wind spool into the film patrone.

In order to rewind the film wound on the wind spool 12 into the film patrone, the motor built in the wind spool 12 is rotated counterclockwise. The driving force of the motor rotates the first sun gear 5 in the planetary gear mechanism 30 counterclockwise through the motor shaft 1a and the gears 1, 2, 3 and 4 as shown in FIG. 6, and therefore, the second sun gear 8 in the planetary clutch mechanism 31 in engagement with the first sun gear 5 is rotated clockwise together with the second carrier 10, and the second planetary gear 9 and the major diameter gear of the double gear 11 are disengaged. Accordingly, the spool gear 12b and the wind spool 12 are separated from the train of gears and put into a free state in which they do not receive any driving force.

On the other hand, when the first sun gear 5 rotates counterclockwise, the first planetary gear 6 engaged with the first sun gear 5 starts to revolve in the counterclockwise direction. The carrier shaft 7a for supporting the planetary gear 6 abuts against the standing portion 10a of the second carrier 10, thereby stopping the revolving operation of the planetary gear 6. At this time, since the first planetary gear 6 continues rotating in the clockwise direction, the internal gear 13 engaged with the planetary gear 6 on its inner peripheral surface rotates clockwise. The internal gear 13 is also engaged with the double gear 14 on its outer peripheral surface, and the driving force thereof is transmitted to the fork portion 20a through the train of gears 15, 16, 17, 18, 19 and 20 to rotate the fork portion 20a in the counterclockwise direction, that is, the film rewind direction. Therefore, the spool shaft in the film patrone engaged with the fork portion 20a rotates in the film rewind direction, and rewinds the film wound on the wind spool 12 into the film patrone.

Since the wind spool 12 is, as mentioned above, disengaged from the train of gears and freed by the planetary clutch mechanism 31, the rotational driving force of the motor smoothly rotates the spool shaft, which is rotated by the fork portion 20a, in the film rewind direction.

As described above, according to the embodiment of the present invention, the film housed in the film patrone can be fed out, wound and rewound smoothly only by rotating the motor built in the wind spool 12 in the forward and backward directions through the use of the planetary gear mechanism 30 as a differential gear mechanism and the planetary clutch mechanism 31 as a transmission mechanism. In the film wind operation, the peripheral speed difference caused between the wind spool 12 and the spool shaft in the film patrone is controlled by the reduction of the train of gears, by which a smooth film winding can be achieved. Furthermore, since the wind spool 12 (on the wind side) and the fork portion 20a (on the feed-out side) are simultaneously driven in winding the film, the film can be wound more efficiently.

Still furthermore, it is possible to achieve space saving inside the camera and contribute to the downsizing of the camera by simplifying the structure of the film transport device through the use of the planetary gear mechanism 30.

What is claimed is:

1. A film transport device of a camera in which a film wind speed for winding a film on a wind spool is set higher than a film feed-out speed for winding the film by rotating a spool shaft in a film patrone, comprising:

a motor for producing an output for feeding out or winding the film;

a motor shaft for transmitting the output from said motor; and a differential gear mechanism for absorbing a driving force from said spool shaft in said film patrone by a differential operation when a peripheral speed difference is caused between said wind spool and said spool shaft, and for preventing a speed-up rotation of said motor shaft.

2. A film transport device of a camera according to claim 1, wherein said differential gear mechanism is a planetary gear mechanism including internal gear means.

3. A film transport device of a camera in which a film wind speed for winding a film on a wind spool is set higher than a film feed-out speed for winding the film by rotating a spool shaft in a film patrone, comprising:

a motor for producing an output for feeding out or winding the film;

a motor shaft for transmitting the output from said motor;

a differential gear mechanism for absorbing a driving force from said spool shaft in said film patrone by a differential operation when a peripheral speed difference is caused between said wind spool and said spool shaft, and for preventing a speed-up rotation of said motor shaft;

said differential gear mechanism being a planetary gear mechanism including internal gear means; and said planetary gear mechanism comprising distribution means for distributing a driving force from said motor to first transmission gear means for transmitting the driving force to said wind spool and second transmission gear means for transmitting the driving force to said patrone spool shaft, and absorbing the driving force transmitted from said spool shaft through said second transmission gear means by revolving an internal gear and a planetary gear around a sun gear.

4. A film transport device of a camera according to claim 3, wherein said first transmission gear means has a planetary gear mechanism for releasing a transmission to said wind spool in a film rewind operation in which said motor is rotated in a direction opposite the film wind direction.

5. A film transport device of a camera according to claim 1 wherein said differential gear mechanism is driven by said motor shaft for rotating the spool shaft of a film cartridge.

6. A film transport mechanism according to claim 1 wherein said differential gear mechanism includes a planetary gear mechanism having a sun gear and a planet gear meshing with said sun gear and an internal gear for absorbing said driving force by revolving said planet gear about said sun gear.

7. A film transport mechanism according to claim 6 wherein an internal gear couples drive from said planetary gear to said spool shaft.

8. A film transport mechanism according to claim 6, wherein said internal gear further includes an external gear for coupling drive to said spool shaft through an intermediate gear train.

9. A film transport device of a camera in which a film wind speed for winding a film on a wind spool is set higher than a film feed-out speed, comprising:

one motor for feeding out and winding the film;

a first transmission mechanism for transmitting a driving force to said wind spool for winding the film thereon;

a second transmission mechanism for transmitting the driving force to a spool shaft in a film patrone; and a differential gear mechanism for distributing an output of said motor to said first and second transmission mechanisms, and preventing speed-up rotation of a motor shaft when said spool shaft in said film patrone is driven by the film wound on said wind spool and a peripheral speed difference is caused between said wind spool and said spool shaft.

10. A film transport device of a camera according to claim 5, wherein said differential gear mechanism is a planetary gear mechanism including internal gear means.

11. A film transport device of a camera in which a film wind speed for winding a film on a wind spool is set higher than a film feed-out speed, comprising:

one motor for feeding out and winding the film;

a first transmission mechanism for transmitting a driving force to said wind spool for winding the film thereon;

a second transmission mechanism for transmitting the driving force to a spool shaft in a film patrone; and a differential gear mechanism for distributing an output of said motor to said first and second transmission mechanisms, and preventing speed-up rotation of a motor shaft when said spool shaft in said film patrone is driven by the film wound on said wind spool and a peripheral speed difference is caused between said wind spool and said spool shaft;

said differential gear mechanism being a planetary gear mechanism including internal gear means; and said planetary gear mechanism comprises a sun gear for transmitting an output from said motor to said first transmission mechanism, and an internal gear disposed coaxially with said sun gear through a planetary gear engaged with said sun gear for transmitting the output from said motor to said second transmission mechanism, and absorbing the driving force transmitted from said spool shaft through said second transmission mechanism by revolution of said internal gear and said planetary gear around said sun gear.

12. A film transport device of a camera according to claim 10, wherein said first transmission mechanism has a planetary gear mechanism for releasing transmission of the driving force to said wind spool when said motor rotates in a direction opposite the film wind direction to rewind the film.

13. A film transport device of a camera in which a film wind speed for winding a film on a wind spool is set higher than a film feed-out speed, comprising:

a first transmission mechanism for transmitting an output from a motor to said wind spool;

a planetary gear mechanism for producing an output to a second transmission mechanism, for transmitting the output from said motor to a spool shaft in a film patrone, through an internal gear; and revolution preventing means for preventing one-way revolution of a planetary gear disposed in said planetary gear mechanism and for transmitting driving force from said planetary gear to said internal gear, whereby speed-up rotation of a motor shaft is prevented by revolution of said planetary gear around said internal gear in a direction opposite the preventing the direction of said revolution preventing means when said spool shaft in said film patrone is driven by the film wound on said wind spool.

14. A film transport device comprising:

a motor for winding and rewinding film;

a planetary gear mechanism comprising a first sun gear, a first planet gear revolvable about said sun gear and a driven gear engaging and rotatable by said planet gear;

first coupling gear means for coupling drive from said motor to said first sun gear;

second coupling gear means for coupling drive from said driven gear to a film wind/rewind member for feeding or rewinding film in a film cartridge;

second planetary gear means for selectively coupling drive from said first sun gear to a film take-up spool when said motor is rotated in a first direction and for idling drive from said take-up spool when said motor is rotated in a second direction;

means for selectively blocking revolving of said first planet gear when engaged by said first planet gear;

said driven gear being rotated only after revolving of said first planet gear is halted to thereby initiate rotation of said wind/rewind member; and whereby said take-up spool is idled at least until said wind/rewind member is driven.

15. The film transport device of claim 10 wherein said second planetary gear means comprises a second sun gear driven by said first sun gear and a second planet gear driven by and revolvable about said second sun gear for selectively driving and idling said take-up spool.

16. The film transport device of claim 14 wherein said driven gear has an internal gear portion driven by said first planet gear and an external gear portion for driving said second coupling gear means.

17. The film transport device of claim 14 wherein said motor is coaxial with said take-up spool.

18. The film transport device of claim 14 wherein said second planetary gear means includes means entering a revolving path of said first planet gear for blocking revolving of said first planet gear when said motor is rotated in said second direction and for being displaced from said revolving path when said motor is rotated in said first direction.

19. The film transport device of claim 14 wherein the peripheral speed of the take-up spool is greater than the feed speed of film being fed out of said film cartridge.

20. The film transport device of claim 19 wherein the selective blocking means had a first portion which blocks revolving of the first planet gear in a direction when film is being fed to and wound upon the take-up spool and a second portion for enabling the blocking means to move out of the revolving path of the first planet gear when the film is being rewound.

21. The film transport device of claim 20 wherein said blocking means is comprised of a member rotatable about a pivot, one end of said member being provided with said first and second portions; and resilient bias means for urging said one end into the revolving path of said first planet gear.

22. A film transport device of a camera in which a film wind speed for winding a film on a wind spool is set higher than a film feed-out speed for unwinding the film by rotating a spool shaft in a film patrone, comprising:

a motor for producing an output for feeding out or winding the film;

a motor shaft for transmitting the output from said motor;

a differential gear mechanism for absorbing speed-up rotation of said motor shaft by a driving force from said spool shaft of said film patrone by a differential operation of a gear when a peripheral speed difference is caused between said wind spool and said spool shaft as a film is wound around said wind spool, and for stabilizing the film feed-out speed by transmitting a predetermined driving force to a spool shaft of said film patrone.

23. A film transport device of a camera according to claim 22, wherein said differential gear mechanism has a sun gear transmitting a driving force from a motor shaft to said wind spool, an internal gear transmitting a driving force from the sun gear to a spool shaft in said patrone, and a planetary gear transmitting a driving force to the internal gear, said planetary gear absorbing a driving force by moving around an interior of the internal gear when the sun gear receives a driving force for rotating the wind spool, the planetary gear being provided between the sun gear and the internal gear.

24. A film transport device of a camera according to claim 23, further comprising a selective coupling mechanism provided between said sun gear and said wind spool, said selecting mechanism transmitting a driving force from said sun gear to said wind spool during film winding about the wind spool and for interrupting the driving force during film rewinding about spool shaft.

25. A film transport device of a camera comprising:

a film wind-up spool;

a drive fork for driving a spool shaft of a film cartridge;

a differential gear mechanism driven by an output of said motor including a first planetary gear mechanism;

an internal gear driven by a planetary gear of said first planetary gear mechanism;

means for coupling drive from said internal gear to said spool shaft at a first rotational speed;

coupling means arranged between a sun gear of said first planetary gear means and a wind-up spool for driving said wind-up spool at a second rotational speed greater than first rotational speed; and whereby the planetary gear of said differential gear mechanism absorbs an increase in rotational speed of said internal gear due to film from said film cartridge being wound about the take-up spool by revolving about said sun gear to assure delivery of smooth, continuous rotational drive to said take-up spool.

26. The film transport device of claim 25 further comprising selective blocking means driven by said sun gear for preventing rotation of said planetary gear after revolving through a given angle about the sun gear when said sun gear rotates in a first direction and being displaced from the planetary gear to permit the planetary gear to rotate without interference by said blocking means.

27. The film transport device of claim 26 wherein said planetary gear drives the internal gear to rotate the drive fork when it engages the blocking means.

28. The film transport of claim 25 further comprising spring-biased selective blocking means having a hook portion engageable by said planetary gear when said motor is rotated in a first direction to restrain further revolving of said planetary gear in a first direction, causing rotation of said planetary gear, which rotates the internal gear to rotate said drive fork and having a smooth guide surface engageable with the planetary gear when said motor operates in a second direction opposite said first direction to move the spring-biased selective blocking means away from the planetary gear.

29. The film transport device of claim 25 further comprising:
a second planetary gear mechanism coupled between said differential gear mechanism and said take-up spool to provide rotational drive to said take-up spool only while said motor is driven in a predetermined direction.

* * * * *